(12) United States Patent
Jain et al.

(10) Patent No.: US 10,042,944 B2
(45) Date of Patent: Aug. 7, 2018

(54) SUGGESTED KEYWORDS

(71) Applicant: Microsoft Technology Licensing, LLC, Redmond, WA (US)

(72) Inventors: Aastha Jain, Sunnyvale, CA (US); Nikita Igorevych Lytkin, Sunnyvale, CA (US); Vitaly Gordon, Mountain View, CA (US); Gloria Lau, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 14/308,496

(22) Filed: Jun. 18, 2014

(65) Prior Publication Data

US 2015/0370805 A1 Dec. 24, 2015

(51) Int. Cl.
 *G06F 17/30* (2006.01)
 *G06Q 50/00* (2012.01)

(52) U.S. Cl.
 CPC .... *G06F 17/3089* (2013.01); *G06F 17/30867* (2013.01); *G06F 17/3053* (2013.01); *G06F 17/3056* (2013.01); *G06F 17/30598* (2013.01); *G06F 17/30699* (2013.01); *G06F 17/30864* (2013.01); *G06Q 50/01* (2013.01)

(58) Field of Classification Search
 CPC ........ G06F 17/30867; G06F 17/30864; G06F 17/3053; G06F 17/3056; G06F 17/30598; G06F 17/30699; G06F 17/27
 USPC ....... 707/730, 748, 728, 749, 723, 732, 737, 707/758, 784
 See application file for complete search history.

(56) References Cited

U.S. PATENT DOCUMENTS

| | | | | |
|---|---|---|---|---|
| 8,175,989 B1* | 5/2012 | Gopinath | ............... | G06N 7/005 706/45 |
| 8,296,660 B2* | 10/2012 | Macadaan | ............. | G06F 3/0482 715/745 |
| 8,341,169 B2* | 12/2012 | Nance | ............... | G06F 17/30699 707/758 |
| 8,612,434 B2* | 12/2013 | Srikrishna | ............. | H04L 65/403 707/732 |
| 8,615,524 B2* | 12/2013 | Kanigsberg | ....... | G06F 17/30867 707/765 |
| 8,676,937 B2* | 3/2014 | Rapaport | ................ | H04L 51/32 709/219 |
| 9,123,022 B2* | 9/2015 | Skarin | .................... | G06Q 10/10 |

(Continued)

*Primary Examiner* — Dangelino N Gortayo
(74) *Attorney, Agent, or Firm* — Schwegman Lundberg & Woessner, P.A.

(57) ABSTRACT

A suggested keywords system is configured for identifying phrases, which are most relevant to experience and expertise of a professional network member, and which the member may be interested in weaving into their profile summary. The suggested keywords system generates a model, for each phrase, that calculates probability of that phrase being present in a profile that is characterized by the absence of certain attributes and by the presence of certain attributes. Based on the model, the suggested keywords system calculates a ranking value for the phrase for a particular target profile. The phrases with the higher rank are considered to be more relevant in describing professional background of the target member. A certain number of phrases that have the highest ranking are presented to the member as suggested keywords to be included in their professional summary.

20 Claims, 6 Drawing Sheets

(56) References Cited

U.S. PATENT DOCUMENTS

| | | | |
|---|---|---|---|
| 2008/0227063 A1* | 9/2008 | Kenedy | G06Q 40/00 434/219 |
| 2009/0049036 A1* | 2/2009 | Juan | G06Q 10/10 707/999.005 |
| 2010/0274815 A1* | 10/2010 | Vanasco | G06F 17/30867 707/798 |
| 2013/0091217 A1* | 4/2013 | Schneider | G06Q 50/01 709/204 |
| 2015/0242815 A1* | 8/2015 | Velasco | G06Q 10/1053 705/321 |

* cited by examiner

SUGGESTED KEYWORDS

TECHNICAL FIELD

This application relates to the technical fields of software and/or hardware technology and, in one example embodiment, to system and method to suggest keywords to a social network member.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to suggest keywords to a social network member in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A profile of a member of a social network is a representation of the member's identity, which the member may want to share with other members in the network. A member profile may be associated with social links that indicate that member's connection to other members of the social network. A member profile may also include or be associated with comments or endorsements from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information provided by the member's connections. Information provided by the member's connections may be, e.g., recommendations, endorsements and skills. The profile of a member may include several items or units of a profile. For example one unit of a profile may contain information about the member's education, while another unit may contain information about the member's current and past employment.

The profile of a member may also include a concise summary of the member's entire professional experience and expertise, and any other information the member is willing to share with the network. The task of creating a professional summary may be challenging for an individual, as it may require creative synthesis of the information from the entire profile. At the same time, the content of a profile summary may be very important as it may affect the ranking of a member (e.g., professional ranking) in the on-line social network. A professional summary of a member may be viewed by employment recruiters who are interested in understanding a candidate's professional background. Thus, a poorly constructed profile summary may result in fewer professional opportunities for a member and may also affect how the profile of the member appears in search results.

In order to aid a user in writing a professional summary, it may be beneficial to utilize a system for generating suggested keywords for social network members (also referred to as suggested keywords system). A user (a member of the social networking system), who is being provided with suggested keywords, may be referred to as a target member. A profile associated with a target member may be referred to as a target profile. A suggested keywords system, in one example embodiment, may be configured for identifying textual phrases, which are most relevant to a given member's professional experience and expertise, and which the member may be interested in weaving into their profile summary to help enrich its contents in order to attract recruiters, potential customers and collaborators, and to appear in a larger number of relevant search results. It will be noted, that a phrase is to be understood to be an n-gram: a contiguous sequence of n items from a given sequence of text.

Figure 5:
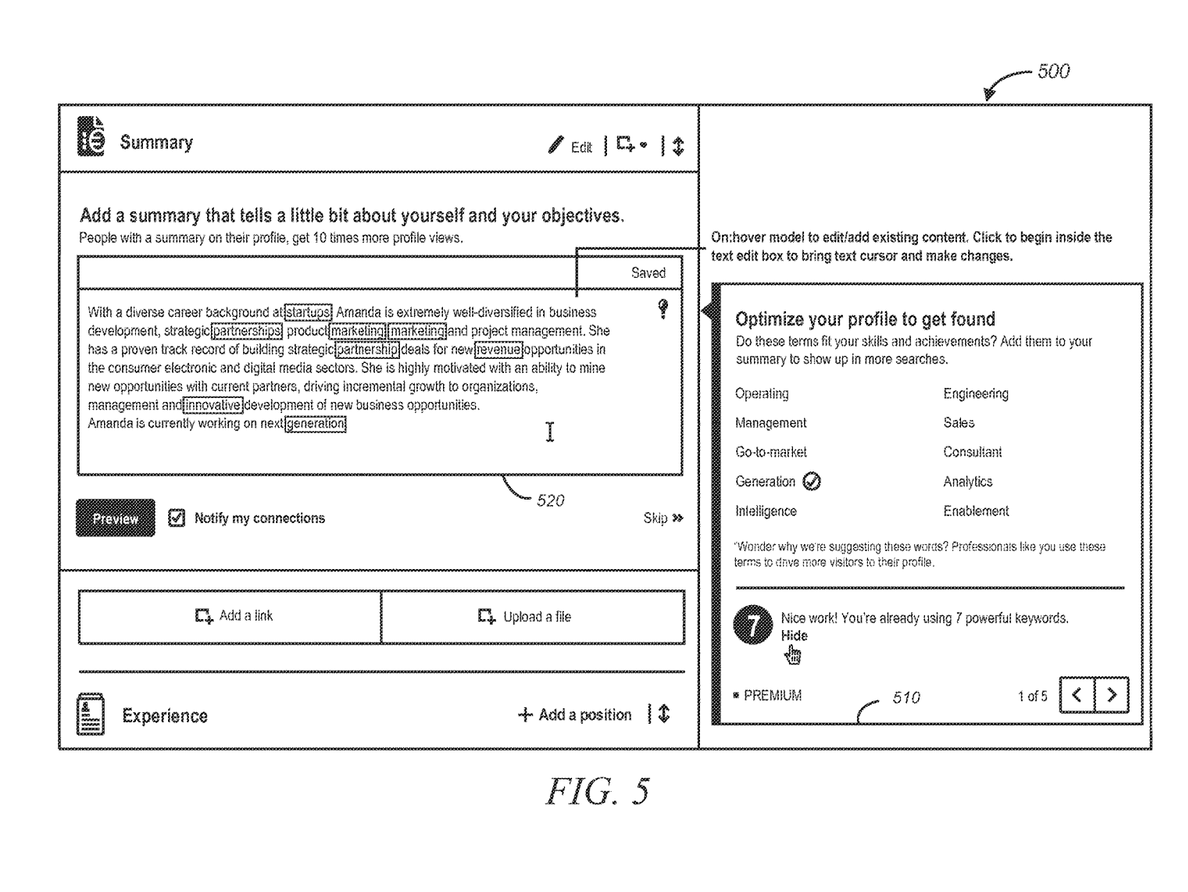
FIG. 5 is a user interface diagram illustrating a summary section of a member profile representing a member of an on-line social network system and a presentation of suggested keywords, in accordance with an example embodiment.

In one embodiment, the suggested keywords system generates a model for each phrase that calculates probability of that phrase being present in a profile that is characterized by the absence of certain attributes and by the presence of certain attributes. Any item of information that can be included in a member profile may be considered an attribute. For example, categories of skills, job functions, certifications, degrees of education, as well as various phrases, may be considered to be attributes. In a given profile, an attribute may be either present or absent (which may be expressed by a Boolean value) or it may have a calculated probability of being present or absent (which may be expressed as a weight coefficient). A profile may be represented by a feature vector that compromises, for each attribute from a given set of attributes, an indicator of a presence or an absence of that attribute in the target profile. Based on the model generated for a phrase, the suggested keywords system calculates a ranking value for the phrase for a particular target profile, utilizing the feature vector that represents that particular target profile. The phrases with the higher rank are considered to be more relevant in describing professional background of the target member. A certain number of phrases that have the highest ranking may be presented to the target member as suggested keywords to be included in the member's professional summary. An example screen 500 that illustrates presentation of suggested keywords to a user who is in the process of editing his professional summary is shown in FIG. 5.

The ranking of the phrases for a target profile may be recalculated periodically and stored in a database. The ranking of the phrases for a target profile may also be calculated on-demand, e.g., in response to detecting that a user has accessed a web page in the on-line social networking system that permits creating or editing of a summary section of the profile that represents the user.

In operation, according to one embodiment, the suggested keywords system may first extract n-grams from the member profiles maintained by the on-line social networking system. The n-grams may be passed through a series of filters, which may include thresholding by occurrence frequency, removal of n-grams with offensive or common words (e.g., "the"), filtering on the basis of part of speech patterns, as well as other criteria. The end result of the filtering stage may be a dictionary of potentially informative and semantically meaningful n-grams. However, many of these n-grams may not be relevant to a particular target member's profile. In order to identify those n-grams from the dictionary that are most relevant to a particular target profile and to provide a list of n-grams ordered by relevance to the target member, a set of predictive models (e.g., one per n-gram) may be constructed.

For each n-gram, a model estimating the probability of a profile containing the n-gram as a function of profile attributes is trained using a set of member profiles from the on-line social network. The training set may consist of all profiles in the network, or a subset thereof. In one embodiment, models are trained on profiles whose contents are in the same language as the corresponding n-grams.

The set of member profile attributes, whose values are to be given as inputs to an n-gram prediction model, may consist of other n-grams, skills, member's current and/or past job function categories, member's industry, education, certifications, interests, and any other signals that may be relevant for predicting whether or not a particular n-gram will appear in the profile. Each profile j may be represented as a vector $x_j=(x_j^{(1)}, x_j^{(2)}, \ldots, x_j^{(d)})$ in a d-dimensional space, referred to as the feature space or a profile feature vector, with each dimension corresponding to one of the attributes.

For example, an on-line professional networking system may maintain, e.g., 20,000 of distinct skill classifications (also referred to as merely skills). The suggested keywords system may construct an equal number of dimensions, each corresponding to one of 20,000 skills. If the j-th member profile contains a given skill, the coordinate corresponding to that skill in feature vector $x_j$ will be set equal to 1. Otherwise, it will be zero. Some skills and other attributes may not be explicitly declared in the profile, but their likelihood of being possessed by the member may be inferred by another model. If such information is available, it can be readily incorporated into the above representation. For instance, if a particular skill is not listed on the profile of the j-th member profile, but an estimate is available of the probability that the member has this skill, that probability can be recorded in the appropriate coordinate of the feature vector $x_j$ representing this member profile.

For each n-gram i, a training set may be constructed $\{(y_{ij}, x_j)\}$, j=1, ..., n, for building a predictive model, where $$y_{ij} = \begin{cases} 1, \text{ if } n\text{-gram } i \text{ is present in profile } j \\ 0, \text{ otherwise} \end{cases}$$

is the indicator variable of n-gram i, $x_j$ is the feature vector representing profile j, and n is the number of profiles in the training set. The model aims to estimate the probability $Pr(Y_i=1|X)$ of n-gram i being present in a profile given its feature vector X. Many of the standard models, such as Naïve Bayes or Logistic regression, can be used for this purpose. Naïve Bayes for categorical data has the advantages of simplicity of implementation, low computational complexity and of being highly parallelizable. The latter two properties may be particularly beneficial since the number of models that need to be trained equals the number of n-grams in the dictionary, which may be, e.g., in the millions, while the number of training examples for each n-gram equals the number of member profiles forming the training set, which may be, e.g., in tens or hundreds of millions. Logistic regression, on the other hand, is well-suited for both categorical as well as real-valued features, but it may have higher computational and implementation complexities, because parameter estimation for Logistic regression may require solving a multivariate optimization problem.

In order to take advantage of all the benefits of Naïve Bayes described above while also supporting real-valued features in the model, an ensemble of univariate predictors may be constructed based on the Logistic model, where separate univariate predictors estimate respective coefficients β for each attribute. The Logistic model for calculating probability of each n-gram being present in respective profiles characterized by their respective feature vectors is shown as equation (1) below.

$$Pr(Y=1|X=x)=1/(1+\exp(-\beta^T x)), \quad (1)$$

where vector $\beta=(\beta^{(1)}, \beta^{(2)}, \ldots, \beta^{(d)})$ of parameters (coefficients corresponding to respective attributes) is estimated using multivariate optimization over the training set. Each parameter $\beta^{(k)}$, k=1, . . . , d, (where d is the number of attributes) models the instantaneous change in log odds of Y=1 due to a small change in $x^{(k)}$, which, in case of Boolean data, corresponds to the log odds ratio $$\beta^{(k)} = \ln\left(\frac{Pr(Y=1|X=(0x^{(1)}, x^{(2)}, \ldots, x^{(k-1)}, 1, x^{(k+1)}, \ldots, x^{(d)}))}{Pr(Y=0|X=(x^{(1)}, x^{(2)}, \ldots, x^{(k-1)}, 1, x^{(k+1)}, \ldots, x^{(d)}))} \bigg/ \frac{Pr(Y=1|X=(x^{(1)}, x^{(2)}, \ldots, x^{(k-1)}, 0, x^{(k+1)}, \ldots, x^{(d)}))}{Pr(Y=0|X=(x^{(1)}, x^{(2)}, \ldots, x^{(k-1)}, 0, x^{(k+1)}, \ldots, x^{(d)}))}\right)$$

conditional on values of all other k−1 variables in X held fixed. According to one example embodiment, the approach taken in this work consists of removing the conditioning on other variables, estimating coefficients $\beta_{univ}^{(k)}$ for k=1, . . . , d, separate univariate Logistic models using maximum likelihood, and then using these estimates in the Logistic model expressed as equation (1). In case of Boolean data, $\beta_{univ}^{(k)}$ is estimated by the log odds ratios $$\beta_{univ}^{(k)} = \ln\left(\frac{Pr(Y=1|X^{(k)}=1)}{Pr(Y=0|X^{(k)}=1)} \bigg/ \frac{Pr(Y=1|X^{(k)}=0)}{Pr(Y=0|X^{(k)}=0)}\right),$$

$$k = 1, \ldots, d$$

Note that if a feature is not predictive of whether or not the n-gram will appear in a profile, the corresponding log odds ratio will be zero (subject to statistical variability of the estimator) and the feature will have no influence on the prediction. Also note that model expressed by the equation (1) represents one of many possible ways of combining univariate predictors. Examples of alternative combination strategies include (i) taking the average, minimum or maximum of $\beta_{univ}^{(k)} x^{(k)}$, k=1, . . . , d, instead of their sum in the equation (1), and (ii) computing probability expressed by the equation (1) for each $\beta_{univ}^{(k)} x^{(k)}$ separately as if it was the only predictor in the model and then taking the average, minimum or maximum of the resulting predictions. In one embodiment, the best method of combining individual univariate predictors can be determined via cross-validation.

Thus, for a given n-gram, a coefficient (also referred to as a weight or a weight value) may be calculated for each attribute that could potentially be present in a member profile. In order to determine the probability of the given n-gram being present in a target profile, the weights of those attributes (with respect to the given n-gram) that are present in the target profiles are combined by applying a scoring function. The result of the application of a scoring function is a ranking value for the n-gram with respect to the target profile. A ranking value for an n-gram expresses probability of the phrase being included in the target profile. An example of a scoring function is given in equation (1). Other examples may include (i) taking the average, minimum or maximum of $\beta_{univ}^{(k)} x^{(k)}$, k=1, . . . , d, instead of their sum in the equation (1), and (ii) computing probability expressed by the equation (1) for each $\beta_{univ}^{(k)} x^{(k)}$ separately as if it was the only predictor in the model and then taking the average, minimum or maximum of the resulting predictions.

Once respective ranking values have been calculated for the n-grams, the suggested keywords system selects a predetermined number of n-grams with the highest ranking values and presents these n-grams to the member represented by the target profile as suggested keywords. Conversely, the n-grams with respective ranking values below a certain threshold may be discarded as being of little or no significance with respect to describing a member represented by the target profile.

The suggested keywords system may also be configured to determine whether the summary section of the target profile already contains any of the high-scoring n-grams and, if so, provide a notification to the member represented by the target profile. For example, the suggested keywords system may be configured to identify a certain number of top-scoring n-grams. If the summary section of the target profile already contains one or more of these identified high-scoring n-grams, the suggested keywords system presents a subset of the top-scoring n-grams that does not include those n-grams that are already present in the summary section. A notification may be provided as a message stating that the member is already using certain powerful keywords in their summary. The keywords that appear in the summary section of the target profile that correspond to n-grams having their respective ranking values within a certain number of top-scoring n-grams may be highlighted in the summary section of the target profile, as shown in FIG. 5 (area 520). A message of encouragement may also be provided, such as, e.g., "Nice work! You're already using 7 powerful keywords," as shown in FIG. 5 (area 510).

Figure 1:
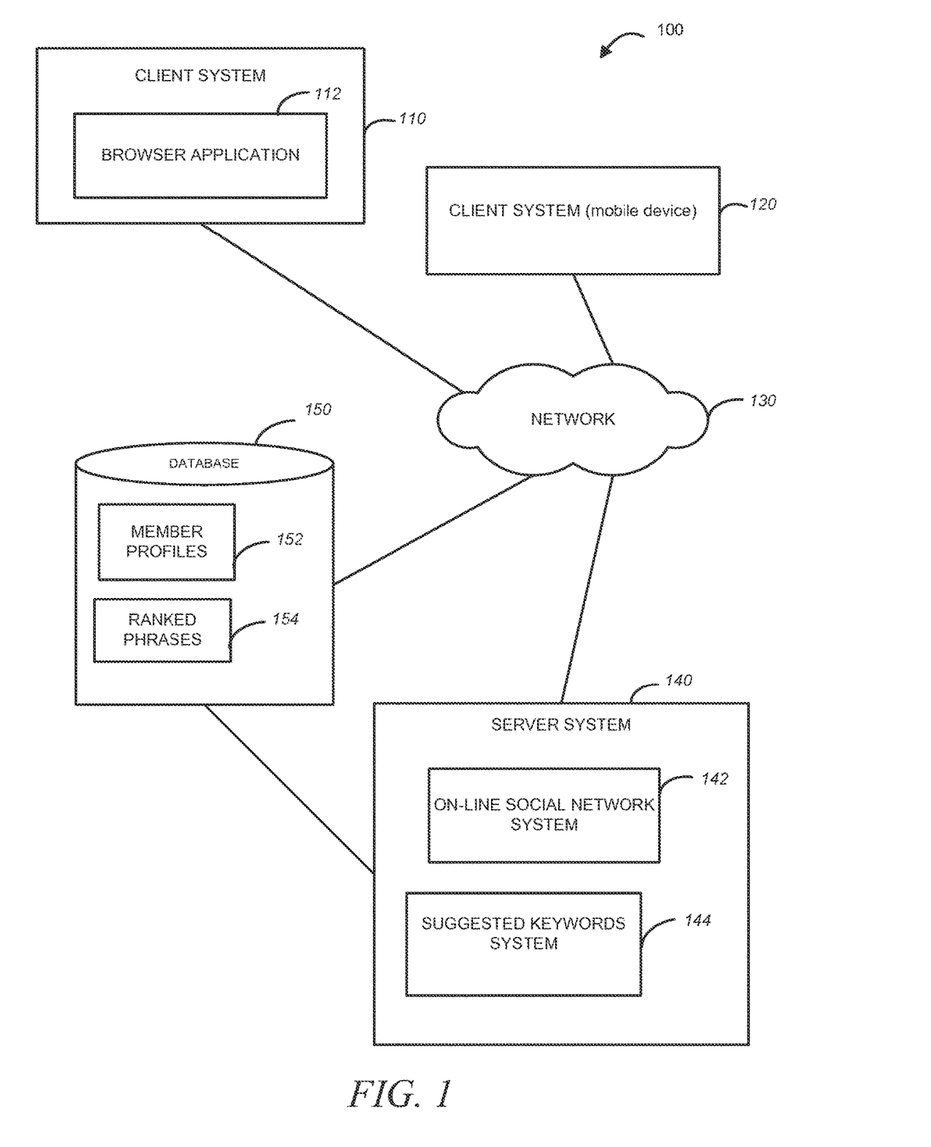
FIG. 1 is a diagrammatic representation of a network environment within which an example method and system to suggest keywords to a social network member may be implemented.

Example method and system for generating suggested keywords for social network members may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a suggested keywords system 144. The suggested keywords system 144 may be configured to determine, for a member represented by a target profile in the on-line social network system 142, phrases (also referred to as summary keywords, keywords, or n-grams) that may be representative of the member's professional skills and experience. In one example embodiment, in order to determine summary keywords for a target profile, the suggested keywords system 144 generates respective profile feature vectors for member profiles in the on-line social network system 142. As described above, a feature vector comprises, for each attribute in the on-line social network system, an indicator of a presence or an absence of that attribute in the target profile. The suggested keywords system 144 calculates respective ranking values for phrases extracted from member profiles in the on-line social network system 142, based on the profile feature vector. A ranking value expresses probability of the phrase being included in the target profile.

The suggested keywords system 144 may be configured to store the top-ranking phrases (e.g., 100 top-ranking phrases) as associated with the target profile, e.g., as ranked phrases 154 in the database 150. The suggested keywords system 144 may be configured to present a certain number of top-ranking words to the member represented by the target profile, e.g., when the member is accessing his profile page for editing the profile. An example suggested keywords system 144 is illustrated in FIG. 2.

Figure 2:
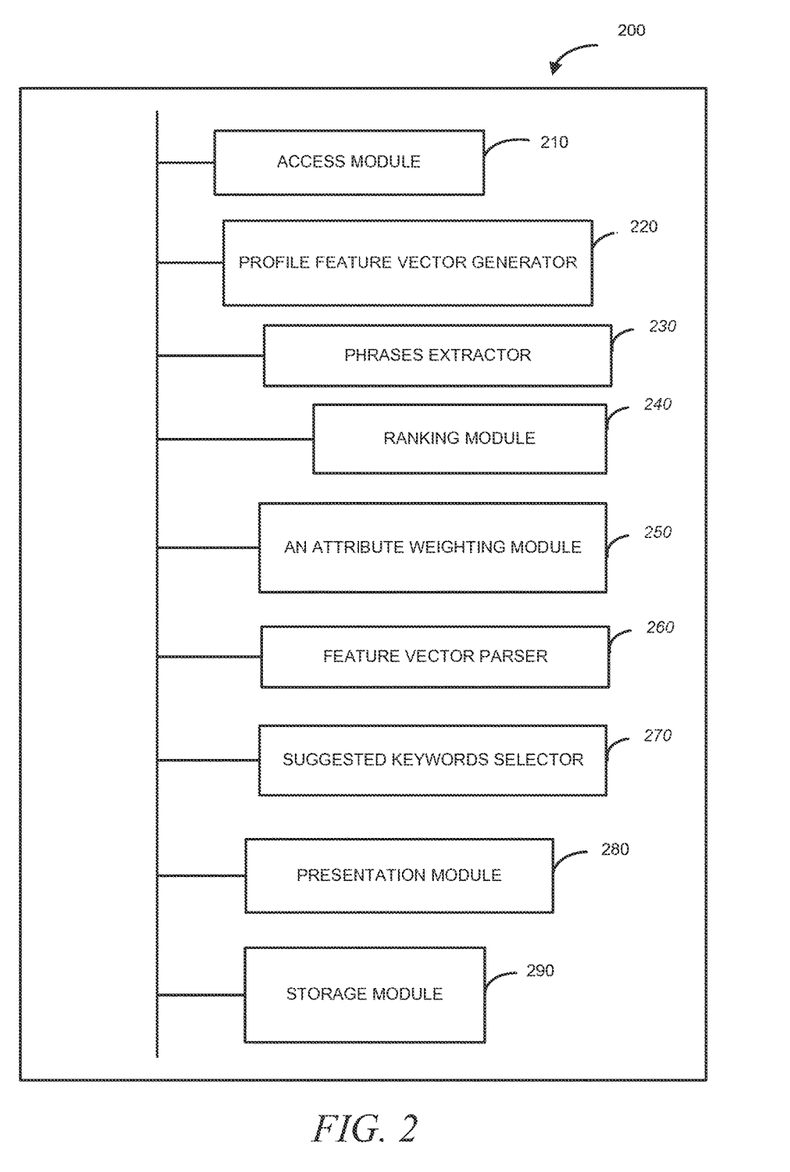
FIG. 2 is block diagram of a system to suggest keywords to a social network member, in accordance with one example embodiment.

FIG. 2 is a block diagram of a system 200 to generate keywords that members of an on-line social network may use in their profile summary, in accordance with one example embodiment. As shown in FIG. 2, the system 200 includes an access module 210, a profile feature vector generator 220, a phrases extractor 230, a ranking module 240, an attribute weighting module 250, and a feature vector parser 260. The access module 210 may be configured to access a target member profile in the on-line social network system 142 of FIG. 1. The profile feature vector generator 220 may be configured to generate a profile feature vector $x_j=(x_j^{(1)}, x_j^{(2)}, \ldots, x_j^{(d)})$ in a d-dimensional space for respective member profiles in the on-line social network system 142. A profile feature vector comprises, for each attribute from the plurality of attributes maintained in the on-line social network system 142, an indicator of a presence or an absence of that attribute in the target profile. The phrases extractor 230 may be configured to extract a plurality of phrases from the profiles in the on-line social network system 142. As explained above, the extracted phrases may be passed through a series of filters to produce a dictionary of potentially informative and semantically meaningful n-grams.

The ranking module 240 may be configured to calculate, for phrases extracted by the phrases extractor 230, respective ranking values. The respective ranking values with respect to a target profile may be generated based on the profile feature vector of the target profile. A ranking value calculated for a phrase expresses probability of the phrase being included in the target profile. The attribute weighting module 250 may be configured to calculate respective weights for each attribute from the plurality of attributes with respect to a phrase from the dictionary of phrases. A weight for a particular attribute is indicative of the likelihood of the phrase being present in a profile that includes the particular attribute. The feature vector parser 260 may be configured to determine, from the profile feature vector, attributes from the plurality of attributes that are present in the target profile. The ranking module 240 may be configured to combine respective weights of the attributes that are present in the target profile to generate a ranking value for the phrase with respect to the target profile. The ranking module 240 may be configured to apply a scoring function to the respective weights in order to produce a ranking value for the phrase with respect to the target profile.

Also shown in FIG. 2 are a suggested keywords selector 260, a presentation module 270 and a storage module 280. The suggested keywords selector 260 may be configured to select a predetermined number of top-scoring (or top-ranking) phrases, based on the results produced by the ranking module 250. For example, in an embodiment, where respective ranks of phrases is determined utilizing an affinity graph and respective correlation values of pairs of phrases, the suggested keywords selector 260 may be selecting a predetermined number of phrases that have the highest rank. In an embodiment, where the ranking module 250 derives respective ranking values for phrases, the suggested keywords selector 260 may be selecting a predetermined number of phrases that have the highest ranking values. The presentation module 270 may be configured to present the selected phrases to a member represented by the target member profile. The storage module 280 may be configured to store respective ranking values or ranks determined by the ranking module 250 for future use, e.g., in the database 150 of FIG. 1 as ranked phrases 154.

The suggested keywords selector 260 may also be configured to determine that the summary section of the target profile contains one or more phrases that are within a certain threshold number of phrases having the highest respective ranks (e.g., the highest ranking values). The presentation module 270 may be configured to present the selected phrases to a member represented by the target member profile, excluding the one or more phrases that are present in the summary section of the target profile. The presentation module 270 may also be configured to present a notification to the member represented by the target profile, e.g., in response to the determining that the summary section of the target profile contains the one or more phrases. A notification may be a message of encouragement, such as, e.g., "Nice work! You're already using 7 powerful keywords," as shown in FIG. 5 (area 510). Some operations performed by the system 200 may be described with reference to FIG. 3.

Figure 3:
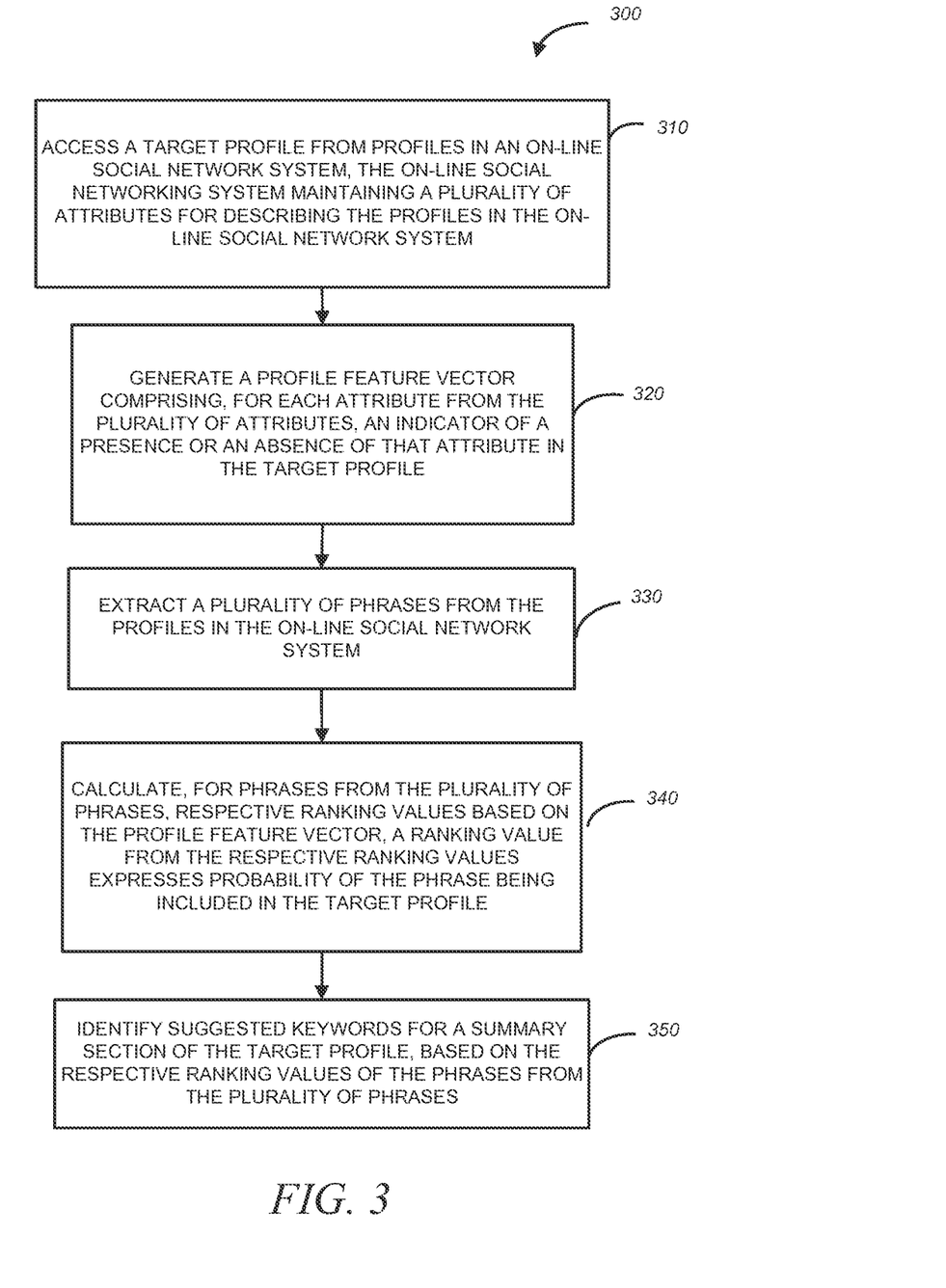
FIG. 3 is a flow chart of a method to identify suggested keywords for a summary section of a profile of a social network member, in accordance with an example embodiment.

FIG. 3 is a flow chart of a method 300 to identify keywords that members of an on-line social network may use in their profile summary, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the access module 210 accesses a target member profile in the on-line social network system 142 of FIG. 1. At operation 320, the profile feature vector generator 220 of FIG. 2 generates a profile feature vector comprising, for each attribute from the plurality of attributes, an indicator of a presence or an absence of that attribute in the target profile. At operation 330, the phrases extractor 230 of FIG. 2 extracts a plurality of phrases from the profiles in the on-line social network system 142. At operation 340, the ranking module 240 of FIG. 2 calculates, for phrases from the plurality of phrases, respective ranking values based on the profile feature vector, where a ranking value from the respective ranking values expresses probability of the phrase being included in the target profile. At operation 350, the suggested keywords selector 270 of FIG. 2 identifies suggested keywords for a summary section of the target profile, based on respective ranking values of the phrases from the plurality of phrases.

Figure 4:
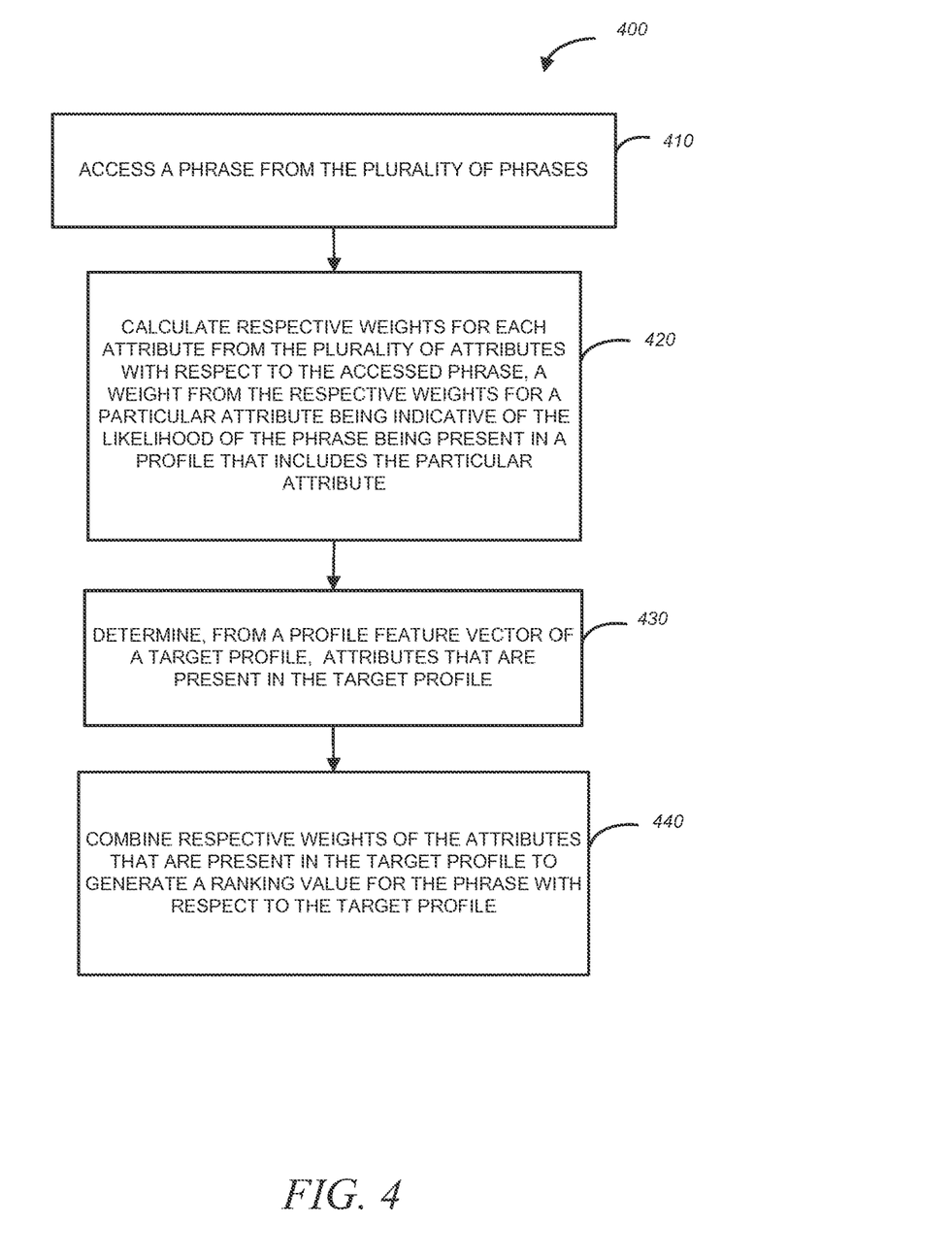
FIG. 4 is a flow chart of a method to identify suggested keywords for a summary section of a profile of a social network member, utilizing univariate predictors, in accordance with an example embodiment.

FIG. 4 is a flow chart of a method to identify suggested keywords for a summary section of a profile of a social network member, utilizing univariate predictors, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 4, the method 400 commences at operation 410, when the access module 210 accesses a phrase from the phrases extracted from the profiles in the on-line social network system 142 of FIG. 1. At operation 420, the attribute weighting module 270 of FIG. 2 calculates, with respect to the accessed phrase, respective weights for the attributes maintained in the on-line social network system 142. As explained above, a weight for a particular attribute with respect to a phrase is indicative of the likelihood of that phrase being present in a profile that includes the particular attribute. At operation 430, the feature vector parser 270 of FIG. 2 determines, from the profile feature vector that represents a target profile, those attributes that are present in the target profile. At operation 440, the ranking module 270 of FIG. 2 combines respective weights of the attributes that are present in the target profile to generate a ranking value for the phrase with respect to the target profile.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 6:
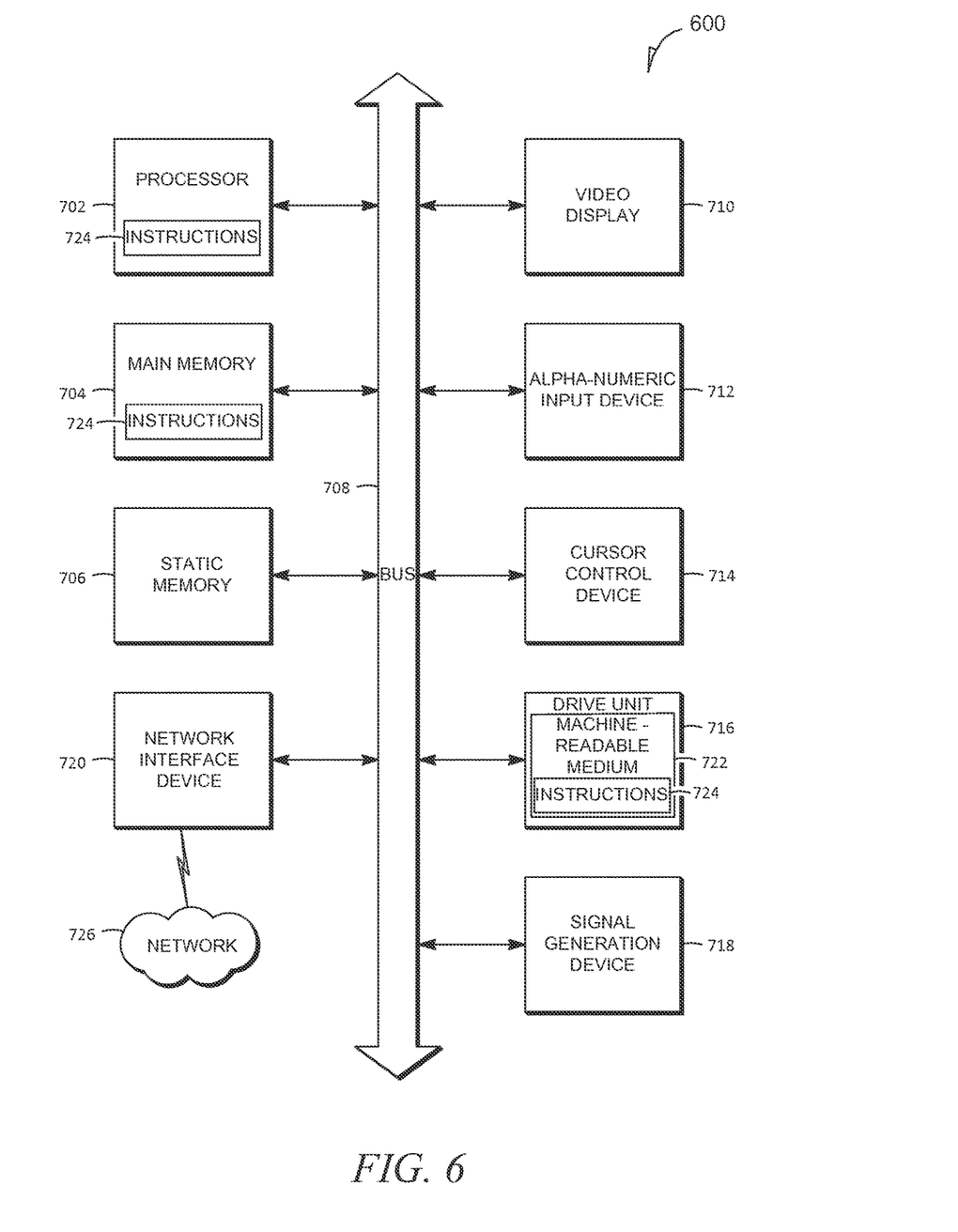
FIG. 6 is a diagrammatic representation of an example machine in the form of a computer system within which a set of instructions, for causing the machine to perform any one or more of the methodologies discussed herein, may be executed.

FIG. 6 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to suggest keywords to a social network member has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A method comprising:
accessing a target profile from profiles in an on-line social network system, the on-line social networking system maintaining a set of different attributes, an attribute from the set of different attributes corresponds to a characteristic of a member represented by a member profile from the profiles in the on-line social network system;
generating, for the target profile, a profile feature vector, the profile feature vector has a number of dimensions equal to the number of items in the set of different attributes, each dimension corresponding to a respective attribute from the set of different attributes, each feature in the profile feature vector being either 1 or 0 to indicate a presence or an absence of an associated attribute in the target profile;
extracting a plurality of phrases from the profiles in the on-line social network system;
calculating, using at least one processor, for phrases from the plurality of phrases, respective ranking values based on the profile feature vector, a ranking value from the respective ranking values expresses probability of the phrase being included in the target profile; and
including a phrase selected from the plurality of phrases based on its ranking value into a profile summary user interface generated for a member represented by the target profile.

2. The method of claim 1, comprising:
calculating respective weights for each attribute from the plurality of attributes with respect to a phrase from the plurality of phrases, a weight from the respective weights for a particular attribute being indicative of the likelihood of the phrase being present in a profile that includes the particular attribute;
from the profile feature vector, determining attributes from the plurality of attributes that are present in the target profile; and
combining respective weights of the attributes that are present in the target profile to generate a ranking value for the n-gram with respect to the target profile.

3. The method of claim 2, wherein the combining of the respective weights of the attributes that are present in the target profile comprises applying a scoring function to the respective weights.

4. The method of claim 1, comprising identifying suggested keywords for a summary section of the target profile, based on respective ranking values of the phrases from the plurality of phrases.

5. The method of claim 4, wherein the identifying of the suggested keywords for the summary section of the target profile is in response to detecting an access request to a webpage comprising a summary section of the target profile.

6. The method of claim 1, comprising storing one or more phrases from the plurality of phrases and their respective ranking values for future access.

7. The method of claim 1, comprising:
selecting a predetermined number of phrases from the plurality of phrases, based on their respective ranking values; and
presenting the selected phrases to a member represented by the target profile.

8. The method of claim 7, comprising:
determining that the summary section of the target profile contains one or more phrases that are within a certain threshold number of phrases having highest respective ranking values; and
presenting the selected phrases to a member represented by the target profile, excluding the one or more phrases that are present in the summary section of the target profile.

9. The method of claim 7, comprising presenting a notification to the member represented by the target profile, in response to the determining that the summary section of the target profile contains the one or more phrases.

10. The method of claim 1, comprising recalculating, periodically, a ranking value for each phrase in the plurality of phrases.

11. A computer-implemented system comprising:
one or more processors; and
a non-transitory computer readable storage medium comprising instructions that when executed by the one or processors cause the one or more processors to perform operations comprising:
accessing a target profile from profiles in an on-line social network system, the on-line social networking system maintaining a set of different attributes, an attribute from the set of different attributes corresponds to a characteristic of a member represented by a member profile from the profiles in the on-line social network system;
generating for the target profile, a profile feature vector, the profile feature vector has a number of dimensions equal to the number of items in the set of different attributes, each dimension corresponding to a respective attribute from the set of different attributes, each feature in the profile feature vector being either 1 or 0 to indicate of a presence or an absence of an associated attribute in the target profile;
extracting a plurality of phrases from the profiles in the on-line social network system;
calculating for phrases from the plurality of phrases, respective ranking values based on the profile feature vector, a ranking value from the respective ranking values expresses probability of the phrase being included in the target profile; and
including a phrase selected from the plurality of phrases based on its ranking value into a profile summary user interface generated for a member represented by the target profile.

12. The system of claim 11, comprising:
calculating respective weights for each attribute from the plurality of attributes with respect to a phrase from the plurality of phrases, a weight from the respective weights for a particular attribute being indicative of the likelihood of the phrase being present in a profile that includes the particular attribute;
determining, from the profile feature vector, attributes from the plurality of attributes that are present in the target profile, the ranking module is to combine respective weights of the attributes that are present in the target profile to generate a ranking value for the phrase with respect to the target profile.

13. The system of claim 12, comprising applying a scoring function to the respective weights.

14. The system of claim 11, identifying suggested keywords for a summary section of the target profile, based on respective ranking values of the phrases from the plurality of phrases.

15. The system of claim 14, comprising identifying the suggested keywords for the summary section of the target profile in response to detecting an access request to a webpage comprising a summary section of the target profile.

16. The system of claim 11, comprising storing one or more phrases from the plurality of phrases and their respective ranking values for future access.

17. The system of claim 11, comprising:
selecting a predetermined number of phrases from the plurality of phrases, based on their respective ranking values; and
presenting the selected phrases to a member represented by the target profile.

18. The system of claim 17, comprising:
  determining that the summary section of the target profile contains one or more phrases that are within a certain threshold number of phrases having highest respective ranking values; and
  presenting the selected phrases to a member represented by the target profile, excluding the one or more phrases that are present in the summary section of the target profile.

19. The system of claim 17, comprising presenting a notification to a member represented by the target profile, in response to the determining that the summary section of the target profile contains the one or more phrases.

20. A machine-readable non-transitory storage medium having instruction data to cause a machine to perform operations comprising:
  accessing a target profile from profiles in an on-line social network system, the on-line social networking system maintaining a set of different attributes, the an attribute from the set of different attributes corresponds to a characteristic of a member represented by a member profile from the profiles in the on-line social network system;
  generating, for the target profile, a profile feature vector, the profile feature vector has a number of dimensions equal to the number of items in the set of different attributes, each dimension corresponding to a respective attribute from the set of different attributes, each feature in the profile feature vector being either 1 or 0 to indicate of a presence or an absence of an associated attribute in the target profile;
  extracting a plurality of phrases from the profiles in the on-line social network system;
  calculating, for phrases from the plurality of phrases, respective ranking values based on the profile feature vector, a ranking value from the respective ranking values expresses probability of the phrase being included in the target profile; and
  including a phrase selected from the plurality of phrases based on its ranking value into a profile summary user interface generated for a member represented by the target profile.

* * * * *

UNITED STATES PATENT AND TRADEMARK OFFICE
CERTIFICATE OF CORRECTION

PATENT NO. : 10,042,944 B2
APPLICATION NO. : 14/308496
DATED : August 7, 2018
INVENTOR(S) : Jain et al.

Page 1 of 1

It is certified that error appears in the above-identified patent and that said Letters Patent is hereby corrected as shown below:

In the Claims

In Column 14, Line 4, in Claim 11, after "or", insert --more--

In Column 14, Line 20, in Claim 11, after "indicate", delete "of"

In Column 15, Line 18, in Claim 20, after "attributes,", delete "the"

In Column 16, Line 7, in Claim 20, after "indicate", delete "of"

Signed and Sealed this
Fourth Day of June, 2019

Andrei Iancu
*Director of the United States Patent and Trademark Office*